(12) United States Patent
Van Der Brug (10) Patent No.: US 9,565,024 B2
(45) Date of Patent: Feb. 7, 2017

(54) CONTROLLER FOR POWER LINE CODING AND POWER LINE CODING METHOD

(71) Applicant: PHILIPS LIGHTING HOLDING B.V., Eindhoven (NL)

(72) Inventor: Willem Peter Van Der Brug, Best (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/916,742

(22) PCT Filed: Sep. 5, 2014

(86) PCT No.: PCT/EP2014/068898
§ 371 (c)(1),
(2) Date: Mar. 4, 2016

(87) PCT Pub. No.: WO2015/032882
PCT Pub. Date: Mar. 12, 2015

(65) Prior Publication Data
US 2016/0197733 A1     Jul. 7, 2016

(30) Foreign Application Priority Data
Sep. 6, 2013 (EP) .................................... 13183382

(51) Int. Cl.
*H05B 37/02* (2006.01)
*H04L 12/10* (2006.01)

(52) U.S. Cl.
CPC ............... *H04L 12/10* (2013.01); *H05B 37/02* (2013.01); *H05B 37/0263* (2013.01); *Y10T 307/477* (2015.04)

(58) Field of Classification Search
CPC . H05B 37/02; H05B 37/0263; H05B 33/0845; H05B 39/086; Y10T 307/477; Y10T 307/944
See application file for complete search history.

(56) References Cited

U.S. PATENT DOCUMENTS

| 5,614,811 A * | 3/1997 | Sagalovich | H02J 13/0034 307/140 |
| 6,031,870 A | 2/2000 | Walley | |
| 6,137,277 A | 10/2000 | Rajda et al. | |
| 6,198,403 B1 * | 3/2001 | Dorrough | G01R 19/2513 324/103 R |

(Continued)

FOREIGN PATENT DOCUMENTS

| JP | 2005136710 A | 5/2005 |
| JP | 2012100147 A | 5/2012 |

(Continued)

*Primary Examiner* — Vibol Tan
(74) *Attorney, Agent, or Firm* — Meenakshy Chakravorty (57) ABSTRACT

A controller provides amplitude modulated power line coding of an output voltage waveform. A transformer has a first winding connected in series with the output. An input mains voltage supply and/or the output voltage are monitored, and the second winding of the transformer is configured in dependence on the monitored mains voltage supply, the monitored output voltage and a target output voltage. This target comprises a voltage which encodes a binary bit of digital information. This provides a feedback approach which enables the transformer to be used to provide an accurate modulation of the binary bit to be encoded.

15 Claims, 4 Drawing Sheets

(56) References Cited

U.S. PATENT DOCUMENTS

| | | | | |
|---|---|---|---|---|
| 6,856,119 B2 * | 2/2005 | Crawford | ............ | H02M 1/4208 |
| | | | | 320/166 |
| 7,539,549 B1 * | 5/2009 | Discenzo | ............ | F04D 15/0077 |
| | | | | 324/765.01 |
| 8,427,074 B1 | 4/2013 | Xiong et al. | | |
| 9,161,415 B2 * | 10/2015 | Catalano | .................. | G01K 7/01 |
| 9,220,152 B2 * | 12/2015 | Van Der Brug | ... | H05B 37/0263 |

FOREIGN PATENT DOCUMENTS

| | | |
|---|---|---|
| KR | 101277650 B1 | 6/2013 |
| WO | 9216041 A1 | 9/1992 |
| WO | 2010147564 A1 | 12/2010 |
| WO | 2013061206 A2 | 5/2013 |

* cited by examiner

CONTROLLER FOR POWER LINE CODING AND POWER LINE CODING METHOD

CROSS-REFERENCE TO PRIOR APPLICATIONS

This application is the U.S. National Phase application under 35 U.S.C. §371 of International Application No. PCT/EP2014/068898, filed on Sep. 5, 2014, which claims the benefit of European Patent Application No. 13183382.4, filed on Sep. 6, 2013. These applications are hereby incorporated by reference herein.

FIELD OF THE INVENTION

This invention relates power line coding, for providing control information to a mains powered device over the mains power line.

BACKGROUND OF THE INVENTION

Power line coding has become an interesting way to control devices without the need for additional control wiring. One example where power line coding has been proposed is in mains lighting.

Lighting fixtures have been designed that are capable of receiving control signals for controlling one or more aspects thereof. For example, some lighting fixtures receive control signals that may at least selectively dictate the dimming levels of such lighting fixtures.

One previous solution for transmitting such control signals utilized one or more stand-alone control wires that extend from a controller to the lighting fixtures. Data packets were then sent over the control wires to control the lighting fixtures. The data packets and communications may conform to a communications protocol such as DMX or DALI. Implementation of such a solution requires the running of one or more separate wires and involves limitations on wiring length and/or wiring method that may not be appropriate for certain applications such as street lighting.

Other previous solutions enable transmitting such control signals without installing new wires. For example, some solutions utilized wireless control signals or communications over the power wires. However, implementation of such solutions requires specific hardware modems and/or radios to be installed at each individual lighting fixture. Such specific equipment is often overly costly and/or may not be easily installed in existing lighting fixtures or light poles supporting lighting fixtures.

WO 2013/061206 discloses a power line coding method, described in connection with an application to lighting fixtures, in which a transformer is switched into or out of circuit to provide a voltage change (thereby implementing an amplitude modulation) which encodes a control signal. This provides a simple encoding method and enables decoding with simple decoding hardware and software.

Providing the desired voltage change consumes power and any power saving measures are of interest.

SUMMARY OF THE INVENTION

The invention is defined by the claims.

According to the invention, there is provided a controller for providing power line amplitude modulated coding of an output voltage at an output of the controller, which output voltage is derived from a mains input voltage supply and comprises a periodic waveform, comprising:

a transformer having a first winding connected in series between the mains input voltage supply and the output;

a sampling and monitoring circuit for sampling and monitoring a voltage of the mains voltage supply before the transformer and/or for sampling and monitoring the output voltage, the sampling and monitoring circuit having a sampling frequency higher than the mains frequency;

a switching arrangement for setting the circuit configuration of a second winding of the transformer;

a switch controller for controlling the switching arrangement to provide a change in the output voltage in dependence on the monitored voltage or voltages and a target output voltage which comprises a voltage which encodes a binary bit of digital information, such that each half cycle or each full cycle of the output voltage encodes an information bit by means of altering the output voltage.

The controller of the invention uses a transformer to provide a controlled change in a mains voltage before supplying an output load. Sampling of the mains voltage before and/or after transformation implements a feedback or feedforward approach which enables a target voltage to be delivered.

The target voltage includes a coding signal for power-line communication.

The control of the invention means that the output voltage including the coding signal can be made closer to the average mains voltage, such that devices connected to the same mains power experience less mains noise. This is of particular interest when the encoding is to be used on a shared grid.

The invention can also enable power savings, because the voltage transformation can be reduced for example if the initial mains voltage is already high, for example as a result of noise. In this way, the power required for the transformation function can be offset by noise power in the mains supply.

The target voltage can for example be an average value for a half period of the output voltage waveform. A change in the output voltage can also be provided such that the magnitude of the average value of the other half period is also set to the target output voltage. This avoids transformer saturation by providing a signal which is symmetric about zero.

The feedback or feedforward approach means that the target voltage is a more reliable representation of the desired digital bit to be encoded, and power savings are possible, for example if an increase in the voltage level already results from an increase in noise. The controller then avoids the transformer adding further disturbance to the mains if noise disturbance already results in a voltage which will be decoded as a high voltage.

The sampling and monitoring circuit in essence monitors the progression of a mains voltage value and adapts the control of the transformer during the output waveform period (or half-period) to arrive at the desired value at the end of the waveform period (or half-period). The monitoring can be at the output (for feedback), at the mains input (for feedforward) or at both (for a combination of feedback and feedforward).

The transformer can be for providing:

a step increase in voltage for an active switching arrangement configuration and no change in voltage for a passive switching arrangement configuration; or a step decrease in voltage for an active switching arrangement configuration and no change in voltage for a passive switching arrangement configuration; or a step increase in voltage for a first active switching arrangement configuration, a step decrease in voltage for a second active switching arrangement configuration, and no change in voltage for a passive switching arrangement configuration.

The controller can thus implement an increase in voltage when desired, or a decrease, or it may be configurable to provide both.

The transformer can have one winding in series with a phase line from which the output voltage is derived and another winding which is switchable by the switching arrangement between the phase line and a neutral line.

The controller can be part of a lighting controller which also has an encoding system for providing target output voltages which encode lighting control information.

Another aspect provides a method of controlling a periodic output voltage to provide power line coding, comprising:

receiving a mains voltage supply;

providing a first winding of a transformer in series between the mains input voltage supply and the output;

sampling and monitoring a voltage of the mains voltage supply before the transformer and/or sampling and monitoring the output voltage, the sampling being at a sampling frequency higher than the mains frequency; and setting the circuit configuration of a second winding of the transformer in dependence on the monitored voltage or voltages and a target output voltage, which comprises a voltage which encodes a binary bit of digital information, wherein in one circuit configuration the transformer provides a change in the output voltage, such that each half cycle or each full cycle of the mains voltage encodes an information bit by means of altering the output voltage.

This method uses a feedback or feedforward approach to control a transformer function to deliver a desired output voltage.

The sampling and monitoring can be carried out for a first fraction of the output voltage period with a first setting of the circuit configuration, and a second setting of the circuit configuration is derived for a second fraction of the period to reach the target output voltage.

This approach provides initial monitoring during an initial period, followed by control of the transformer configuration to achieve the desired overall voltage.

The first fraction and the second fraction can together form a half period so that each half period is controlled to have the desired target output voltage.

The sampling and monitoring can instead be carried out continuously and the setting of the circuit configuration is adjusted continuously.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a controller for providing power line coding of an output voltage waveform in which a transformer has a first winding connected in series with the output. An input mains voltage supply and/or the output voltage are monitored, and the second winding of the transformer is configured in dependence on the monitored voltage, and a target output voltage which comprises a voltage which encodes a binary bit of digital information. This provides a feedback or feedforward approach which enables the transformer to be used to provide an accurate modulation of the binary bit to be encoded.

The transformer can be arranged in various ways. A first example is given below, which is based on WO 2013/061206.

Figure 1:
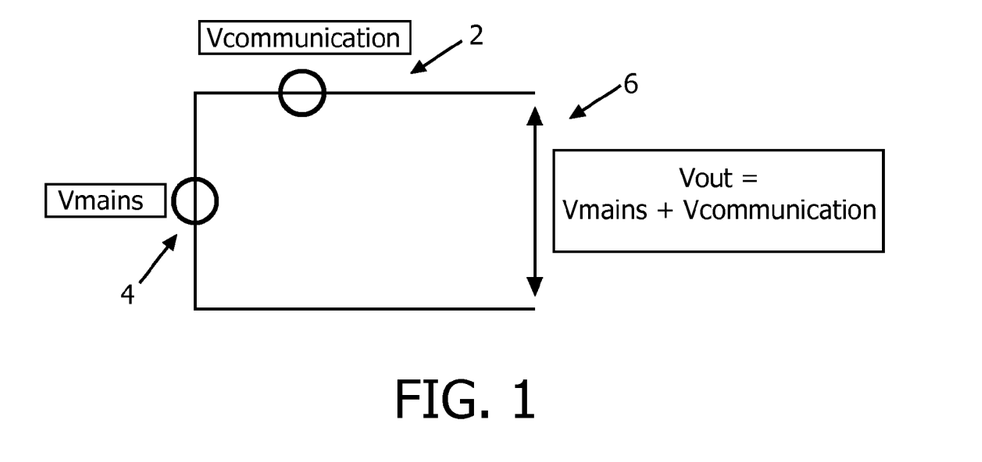
FIG. 1 shows generally how mains line encoding is implemented, in known manner.

FIG. 1 shows the general principle of providing power line encoding using a transformer in series with the load. A communications transformer 2 is placed in series with a line of the mains power supply. The line of the mains power supply 4 may be the phase line, but the transformer can instead be placed along the neutral line.

The mains power supply 4 may include a mains power supply transformer that is sized to power one or more power connected apparatus, such as lighting fixtures, that are connected to a group output voltage 6.

The communications transformer 2 can be modulated by a controller to modulate the voltage supplied over the group output voltage 6 based on a digital data signal. For example, the communications transformer 2 may be modulated during portions of a sine cycle of the voltage supplied by mains power supply 4 to cause a certain voltage increase or voltage drop during such portions of a sine cycle. The voltage drops may correspond to a communications data packet that is to be sent by the communications transformer 2 over the group output voltage 6. The communications transformer 2 only needs to supply the power needed to raise or lower the mains voltage generated by the mains power supply 4.

For example, if the communications transformer 2 effectuates a 1V modulation and the mains power supply is 230V, the power rating of the communications transformer 2 only needs to be 1/230 of the rating of the mains power supply transformer. Accordingly, the communications transformer may be of a small size relative to the mains transformer.

Figure 2:
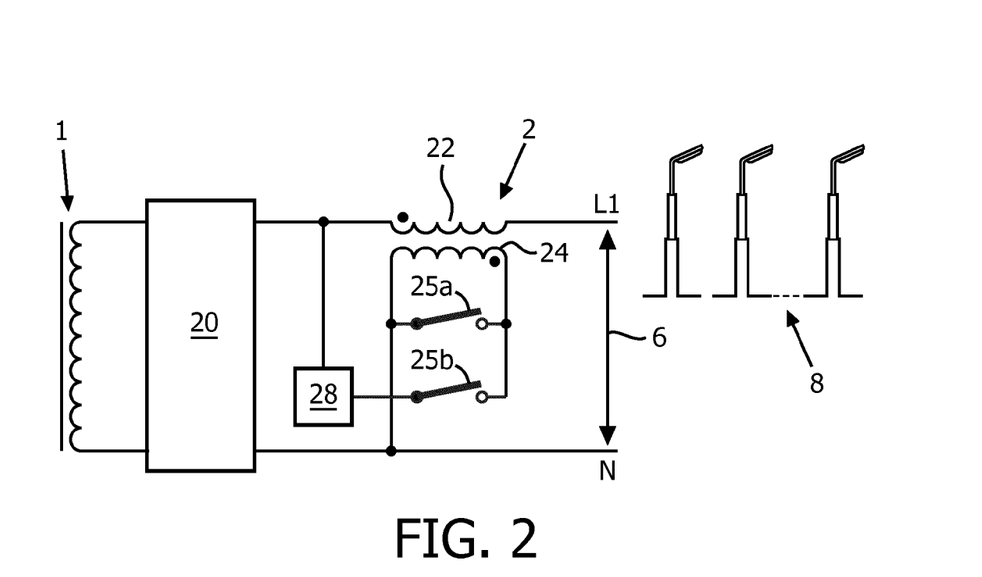
FIG. 2 shows a first example of known mains line coding apparatus.

FIG. 2 shows a more detailed example. The communications transformer 2 is downstream of a mains supply transformer 1 that feeds a distribution panel 20. The mains supply transformer 1 and the distribution panel 20 provide protection, routing, and switching of the output voltage 6 that is supplied over phase line L1 and neutral line N to the load, which can for example comprise lighting fixtures 8.

The transformer 2 has its primary winding 22 connected in series with the phase line L1 to the output, and includes a secondary winding 24. The secondary winding 24 is associated with a plurality of electronically controlled switches 25a, 25b that may be selectively activated to alter the configuration of the transformer 2.

For example, when switch 25b is closed and switch 25a is open, the secondary coils is connected with one orientation between the phase line L1 and the neutral line N. The transformer 2 is switched on and a voltage is added to the normal output voltage. The added voltage may be approximately 1V.

The transformer 2 may additionally or alternatively be configured to decrease the voltage relative to the normal output voltage by changing the polarity of the connection of transformer 2. When switch 25a is closed, the transformer 2 is short circuited and no voltage is added to the normal output voltage.

There is also the possibility to increase and decrease the voltage by using switches in a full bridge configuration, as explained below with reference to FIG. 4.

A switching controller 28 is also illustrated in FIG. 2 that is electronically coupled to the switches 25a, 25b. The controller 28 selectively activates one or more of the switches 25a, 25b to encode a communications data packet in the output voltage 6. For example, in order to transmit a binary data packet, the controller 28 may selectively activate the switches during certain half-sine cycles of the input voltage to provide the active configuration of the transformer, and cause a voltage increase at the lighting fixture group output voltage during those half-sine cycles thereby representing a binary "high". During the other half-sine cycles the transformer can be deactivated thereby representing a binary "low".

In alternative embodiments when activating the transformer causes a voltage drop, in order to transmit a binary data packet, the controller 28 may selectively activate the switching arrangement during certain half-sine cycles of the input voltage to cause a voltage decrease at the output voltage during those half-sine cycles thereby representing a binary "low", and not activate the one of the switches during other half-sine cycles thereby representing a binary "high".

The primary winding and secondary winding will typically have different numbers of turns. One or more taps may be provided for example enabling increase and/or decrease in the turn ratio of the windings through electronic switching of the taps and a corresponding increase and/or decrease to the normal output voltage when the communications transformer is activated.

Figure 3:
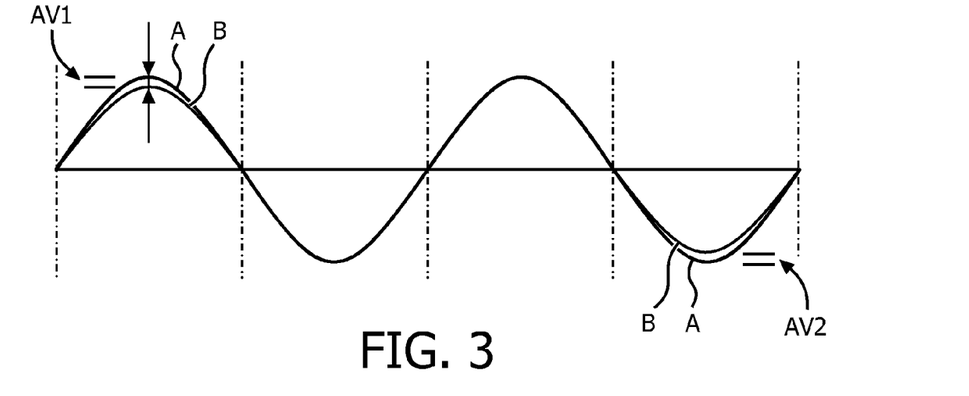
FIG. 3 shows one example of how mains line coding can operate.

FIG. 3 shows a first sinusoidal waveform A and a second sinusoidal waveform B over two full sine cycles thereof. Sinusoidal waveform A is representative of an output voltage that does not include any encoded data packets and that maintains a substantially constant RMS voltage. Sinusoidal waveform B is representative of a waveform that includes encoded data packets and voltage drops in half-sine cycles thereof. Between the first two zero-crossings of the waveform B (denoted by vertical dashed lines), a voltage drop AVI occurs relative to the waveform A.

As mentioned above, in some embodiments the voltage drop AVI may be approximately one volt and may be caused via switching of a single switch. In other embodiments other voltage drops may occur and may optionally utilize more than one switch (e.g., may utilize multiple taps associated with one or both windings of the transformer).

Between the second and third zero-crossings and the third and fourth zero-crossings, no voltage drop occurs, as can be seen by the waveform A and waveform B substantially mirroring one another. Between the fourth and fifth zero-crossings, a voltage drop AV2 occurs relative to the waveform A.

Thus, the transmitted waveform B includes a "low" half-sine cycle, followed by two "high" half-sine cycles, then another "low" half-sine cycle. Additional encoded half-sine cycles may continue to be transmitted as desired.

Instead of encoding bits based on a half sinewave, a full sinewave can be used to encode a bit, in order to avoid saturation of the transformer, by providing a symmetric signal. Thus, a preferred example has a bit encoded as an increased or decreased full sinewave.

FIG. 2 shows an apparatus for encoding on a single phase.

Figure 4:
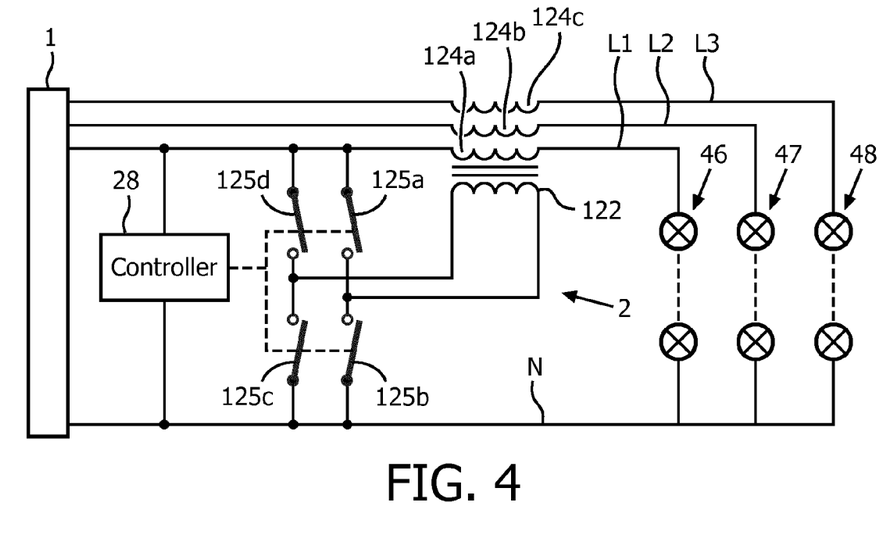
FIG. 4 shows a second example of known mains line coding apparatus.

FIG. 4 shows an alternative circuit in which a single transformer having a single primary winding 122 and three secondary windings 124a,124b,124c provides encoding onto all three phases L1,L2,L3, each of which delivers power to a respective load, in the form of lighting arrangements 46,47,48.

This example also shows a full bridge switch arrangement. This is a preferred enhancement to the more basic two-switch approach of FIG. 2.

The switching arrangement has four switches 125a,125b, 125c,125d, and these mean that the primary winding 122 can be connected with either orientation between the neutral line N and one of the phase lines L1. When switches 125a and 125c are closed, the primary winding has one orientation, and when switches 125b and 125d are closed, the primary winding has the opposite orientation. This means the transformer can cause a step increase or decrease in voltage as desired. The primary winding can also be short circuited to switch off the transformer.

Figure 5:
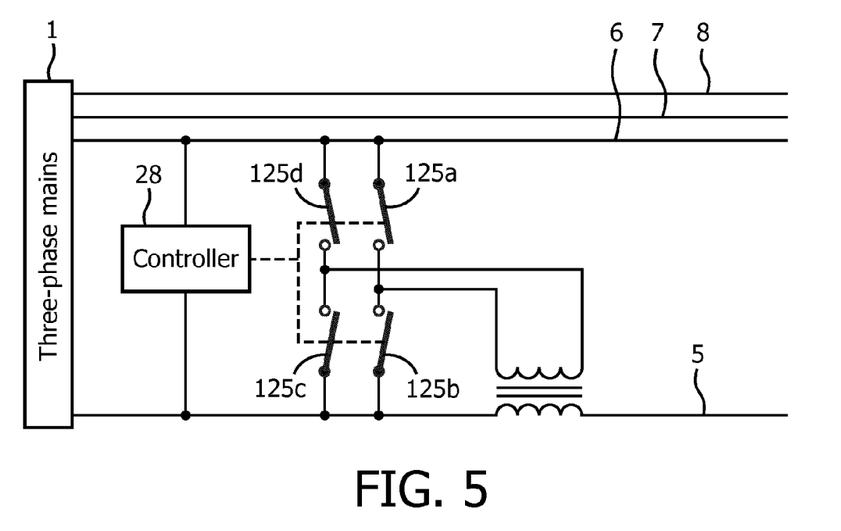
FIG. 5 shows a third example of known mains line coding apparatus.

An alternative to the three separate windings in the three live phases is to provide a single winding in the Neutral wire. An example of circuit arranged in this way is shown in FIG. 5.

These examples all function in the same conceptual way, in that the transformer has a first winding connected in series with the output. A switching arrangement is used for setting the circuit configuration of the second winding of the transformer (which in the example given is the primary winding). A switch controller controls the switching arrangement to provide a change in the output voltage to encode a binary bit of digital information.

Figure 6:
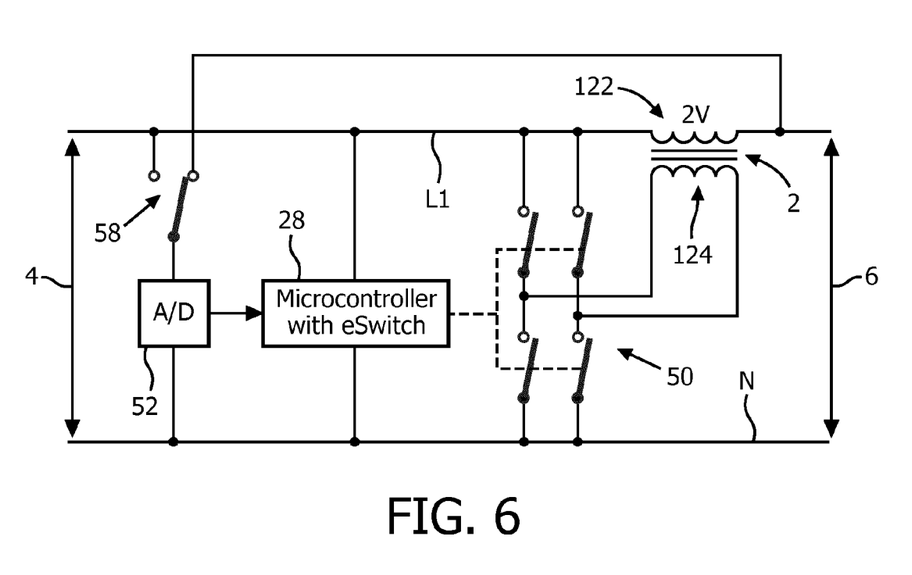
FIG. 6 shows an example of mains line coding apparatus in accordance with the invention.

FIG. 6 shows one example of a controller of the invention. This example is based on the preferred full-bridge switch configuration shown in FIG. 4, but with a single phase line L1. The switching arrangement is shown generally at 50. In this example the transformer implements a voltage change of 2V, although 1V or even lower is also possible.

This example of the circuit has a sampling and monitoring circuit for sampling and monitoring a voltage of the mains voltage supply 4 before the transformer 2 and for sampling and monitoring the output voltage. The sampling and monitoring is implemented by the switch controller 28, and it receives digital signals from an analogue to digital converter 52. A sampling switch 54 is shown which routes the mains input or the output voltage to the converter 52. Of course, separate converters could instead be provided for the input and output voltages.

The analogue to digital converter feeds samples of the input mains voltage and the output voltage to the controller 28. During a half-cycle, the controller operates the switching arrangement such that the average output voltage is according to the desired bit coding. When a full sinewave is used to encode each encoded bit, two successive half-cycles are encoded so that they have the same magnitude of average output voltage. However, since each pair of half-cycles encodes the same information (in order to maintain a zero average value) the decoding operation only needs to analyze one half-cycle.

The sampling frequency and filter at the input of the analogue to digital converter is sufficiently high such that the algorithm in the controller has sufficient time to correct the waveform.

By way of example, the analogue to digital converter sampling rate can be 50 KHz compared to the 50 Hz mains.

The switching frequency of the transformer is also more rapid than the mains frequency so that multiple transformer settings can be made in each halfsine of the mains waveform.

The A/D sampling rate can for example be approximately 100 times the mains frequency, and the transformer switching can for example be carried out two to five times per halfsine of the mains frequency signal.

When there is monitoring of the mains input voltage, the noise in the mains grid can be measured and compensated for while encoding the signal.

For example the average mains voltage over a preceding period (such as 1-3 seconds) can be monitored, and this can be used as a reference to determine if the current mains signal has a noise component. The encoding protocol can ensure an equal number of 0's and 1's to maintain a constant average value. In this way, changes in the average mains value are caused by noise.

In one example, the encoding system has a decoding methodology based on measuring an average voltage over a full half-cycle of the periodic output voltage. This means that it is possible to adjust the voltage during that half-cycle so that the final average voltage takes the desired value.

For a 50 Hz mains signal, the half-cycle has a 10 ms duration. If the controller has measured −230 mV of mains noise during the first 5 ms of the half-cycle, it can then encode an extra +230 mV during the second part of the half-cycle to result in an output voltage which corresponds to the noise free mains input. In this way, an algorithm can operate as a running forecast towards the end of the half-cycle.

Figure 7:
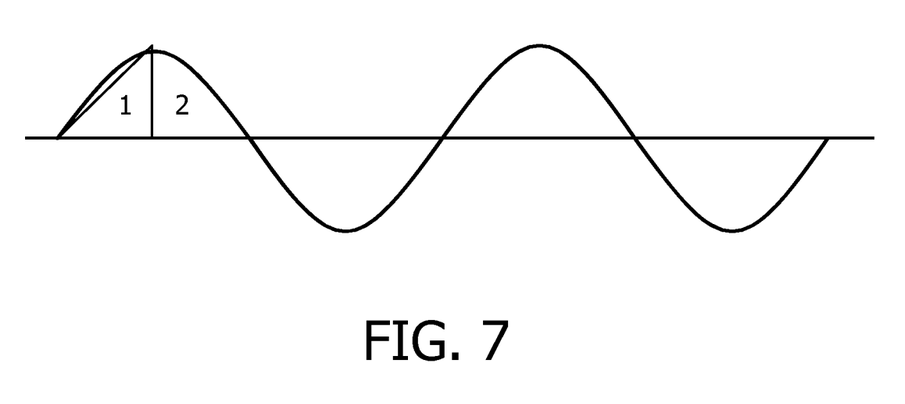
FIG. 7 is used to explain one possible way to implement the method of the invention.

FIG. 7 shows a graphical representation of one example of the how the method of the invention can be implemented.

The mains input voltage to the power line coding controller is shown. The controller starts encoding the mains half-cycle indicated with Period 1+2 with a voltage increase or decrease as appropriate for the bit coding.

After Period 1 (e.g. half way, i.e. 5 ms in a 50 Hz mains system) the transmitter has measured the input noise of the mains averaged over Period 1. The controller then adjusts its voltage increase or decrease such that the expected total voltage coding after the complete half-cycle is exactly as intended by the power line coding protocol.

When the voltage is being adjusted, this can be considered to be an active circuit configuration of the second winding, and when no voltage change is being implemented, this can be considered to be a passive circuit configuration of the second winding.

To provide encoding using a full sinewave, the second half cycle is simply encoded so that the magnitude of the average corresponds to that applied in the first half cycle.

An alternative approach is for the controller to continuously measure the input mains voltage and adjust its output modulation continuously such that the complete integrated half-cycle (average voltage) is exactly as intended by the mains line encoding protocol.

In either case, the modulation, for providing the mains line encoding, is adapted based on the noise of the mains input, so that the modulation (which implements a change in the output voltage) is carried out in dependence on the monitored mains voltage and the target output voltage. The target output voltage is the desired voltage to encode the particular data bit.

The system essentially filters out input noise, and this means the Signal to Noise Ratio of the output voltage signal will be higher. The root mean square noise of the mains supply can be lower in the encoded output voltage waveform than in the original mains signal. Alternatively, a smaller modulation amplitude can be used while achieving the same signal to noise ratio. A lower modulation voltage leads to smaller transmitters and lower cost. This can be achieved in particular because in the event that noise has already altered the mains power waveform to a condition that will be decoded as a "1" by a receiver, no further modulation by means of the transformer is needed.

The method of the invention is essentially implemented by the switch controller 28, making use of the monitored voltages and the bit value to be encoded.

The controller can be implemented in numerous ways, with software and/or hardware, to perform the various functions discussed above. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors (a low cost 8-bit microprocessor with built-in A/D for example), application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM, floppy disks, compact disks, optical disks, magnetic tape, etc. In some implementations, the storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

The invention applies generally to amplitude modulated coded AC mains systems. The lighting example given above is only one specific example of a suitable application for the invention.

In a lighting system using the controller of the invention to encode data, the lighting fixture may be controlled to provide dimming, or for other purposes such as color point control.

The example described above is based on a coding system in which the average voltage over one half-cycle of the mains signal or a full cycle of the mains signal encodes one bit of data.

Thus, the cycle periods during which encoding is applied may comprise only the positive half-cycles, only the negative half-cycles, or the full cycle. It is also possible to encode two independent data streams—one using the positive half-cycles and one using the negative half-cycles.

The data encoded can comprise an encrypted data stream, which may be formed into data packets. The various options discussed in WO 2013/061206 can be applied.

In the example above, the monitoring is carried out for the input mains voltage and the output voltage after the transformer. This provides a combined feedforward and feedback approach.

The system can instead use monitoring only of the output voltage. This provides a feedback approach. In this case, the controller will determine the transformer setting based on a feedback approach, which aims to cause the final average voltage of the halfsine being encoded to end with the desired value representing the encoded bit.

Similarly, the system can use monitoring only the input voltage. This enables a noise determination to be made, and the encoding applied is then adapted to take account of this noise information.

There are many ways to improve decoding robustness. For example forward error correction encoding can be used (such as the 8-to-14 bit coding used in DVD encoding) and command repeating. The encoding may be based on multiple sinewaves instead of the individual half sinewaves as described above, such as the rms value over multiple cycles, to increase robustness.

In order to implement the desired voltage change, the transformer is simply turned on for a desired length of time, so that a pulse width modulation type control is implemented to achieve the desired output voltage.

Two examples of transformer winding configuration have been given above, but other configurations are possible. Essentially, all that is required is a winding in series with the output so that the output voltage can be modulated, and a way to activate or deactivate that winding.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A controller for providing amplitude modulated power line coding of an output voltage at an output of the controller, which output voltage is derived from a mains input voltage supply and comprises a periodic waveform, comprising:
    a transformer having a first winding connected in series between the mains input voltage supply and the output;
    a sampling and monitoring circuit for sampling and monitoring a voltage of the mains voltage supply before the transformer and/or for sampling and monitoring the output voltage, the sampling and monitoring circuit having a sampling frequency higher than the mains frequency;
    a switching arrangement for setting the circuit configuration of a second winding of the transformer;
    a switch controller for controlling the switching arrangement to provide a change in the output voltage in dependence on the monitored voltage or voltages and a target output voltage which comprises a voltage which encodes a binary bit of digital information, such that each half cycle or each full cycle of the output voltage encodes an information bit by means of altering the output voltage.

2. A controller as claimed in claim 1, wherein the sampling and monitoring circuit is adapted to sample and monitor only the output voltage.

3. A controller as claimed in claim 1, wherein the target output voltage is a target average voltage value for one half-cycle of the periodic output voltage.

4. A controller as claimed in claim 3, wherein the switch controller is for controlling the switching arrangement to provide a change in the output voltage such that the magnitude of the other half-cycle is also the target output voltage.

5. A controller as claimed in claim 1, wherein the transformer is for providing:
    a step increase in voltage for an active switching arrangement configuration and no change in voltage for a passive switching arrangement configuration; or
    a step decrease in voltage for an active switching arrangement configuration and no change in voltage for a passive switching arrangement configuration; or
    a step increase in voltage for a first active switching arrangement configuration, a step decrease in voltage for a second active switching arrangement configuration, and no change in voltage for a passive switching arrangement configuration.

6. A controller as claimed in claim 1 wherein the transformer has its first winding in series with a phase line from which the output voltage is derived, and its second winding is switchable by the switching arrangement between the phase line and a neutral line.

7. A controller as claimed in claim 1, wherein the transformer has its first winding in series with a neutral line, and its second winding is switchable by the switching arrangement between a phase line and the neutral line.

8. A lighting controller comprising a controller as claimed claim 1 and an encoding system for providing target output voltages which encode lighting control information.

9. A method of controlling a periodic output voltage at an output, to provide power amplitude modulated line coding, comprising:
    receiving a mains voltage supply;
    providing a first winding of a transformer in series between the mains input voltage supply and the output;
    sampling and monitoring a voltage of the mains voltage supply before the transformer and/or sampling and monitoring the output voltage, the sampling being at a sampling frequency higher than the mains frequency; and
    setting the circuit configuration of a second winding of the transformer in dependence on the monitored voltage or voltages and a target output voltage, which comprises a voltage which encodes a binary bit of digital information, wherein in one circuit configuration the transformer provides a change in the output voltage, such that each half cycle or each full cycle of the output voltage encodes an information bit by means of altering the output voltage.

10. A method as claimed in claim 9, wherein the target output voltage is a target average voltage value for one half-cycle of the periodic output voltage.

11. A method as claimed in claim 9, wherein the setting the circuit configuration provides:
    a step increase in voltage for an active switching arrangement configuration and no change in voltage for a passive switching arrangement configuration; or
    a step decrease in voltage for an active switching arrangement configuration and no change in voltage for a passive switching arrangement configuration; or
    a step increase in voltage for a first active switching arrangement configuration, a step decrease in voltage for a second active switching arrangement configuration, and no change in voltage for a passive switching arrangement configuration.

12. A method as claimed in claim 9, wherein the sampling and monitoring is carried out for a first fraction of the period with a first setting of the circuit configuration, and a second setting of the circuit configuration is derived for a second fraction of the period to reach the target output voltage.

13. A method as claimed in claim 12, wherein the first fraction and the second fraction together form a half period.

14. A method as claimed in claim 9, wherein the sampling and monitoring is carried out continuously and the setting of the circuit configuration is adjusted continuously.

15. A method as claimed in claim 9, wherein setting the circuit configuration comprises selectively switching the second winding between the phase line and a neutral line.

* * * * *